(No Model.)
A. C. BARSTOW.
SPREADING TOOL FOR MACHINES FOR COATING FABRICS WITH PLASTIC MATERIALS.
No. 320,530. Patented June 23, 1885.
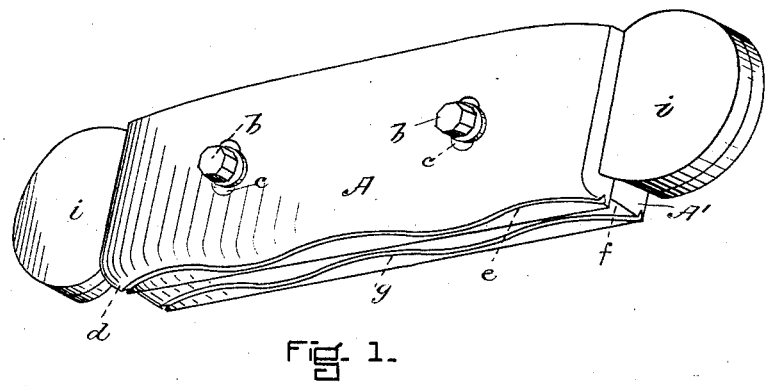
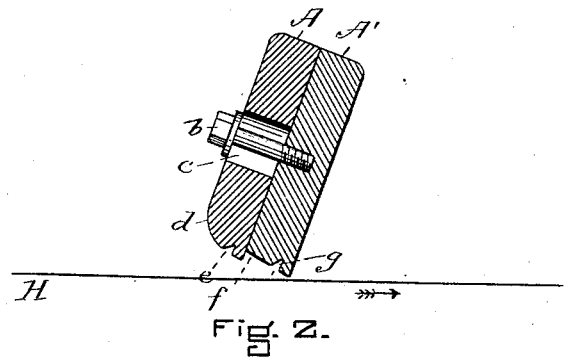
WITNESSES.
J. M. Dolan
Fred. B. Dolan
Albert C. Barstow INVENTOR.
by his Attys
Parkit Raymond

UNITED STATES PATENT OFFICE.

ALBERT C. BARSTOW, OF SALEM DEPOT, NEW HAMPSHIRE.

SPREADING-TOOL FOR MACHINES FOR COATING FABRICS WITH PLASTIC MATERIAL.

SPECIFICATION forming part of Letters Patent No. 320,530, dated June 23, 1885.

Application filed October 23, 1884. (No model.)

*To all whom it may concern:*

Be it known that I, ALBERT C. BARSTOW, of Salem Depot, in the county of Rockingham and State of New Hampshire, a citizen of the United States, have invented a certain new and useful Improvement in Spreading-Tools for Machines for Coating Fabrics with Plastic Material, of which the following is a full, clear, and exact description, reference being had to the accompanying drawings, forming a part of this specification.

Numerous goods are on the market formed of textile fabrics coated with flexible materials applied as a magma, and rubbed, rolled, brushed, or scraped into the fiber and there dried. When the water-proof germs form part of the constituents of this magma, particularly when a solution of caoutchouc or gutta-percha is used, the scraping process has been found the best, and the machine used is generally known as the "knife-machine." In the use of this machine, of which there are several well-known forms, considerable difficulty has been experienced with the spreading-tool, and these difficulties relate to the material of the tool as well as to the form.

My invention relates to this scraping-tool.

After a long series of experiments I have rejected as the material the hard metals, such as iron and steel, because they are apt to cause fires on the machine; the soft metals, such as copper, tin, and bronze, because too flexible or too easily scratched; glass, because of its fragility, and have adopted wood. This wood should be hard and close-grained, like the wood of which shuttles are made, such as apple, pear, maple, and cherry.

Instead of making the scraping part of the tool as a sharp edge or a wire-edge, I form it as double-edged face, one edge fleeted past the other. I thus form a double working-face to this spreading-tool, and I set it in the machine on an incline, so that one of the edges of the double working-face shall be a little higher than the other, and hence there will be a recess between the edges into which the paste to be spread will be forced, and thus will be pressed onto the cloth. I also, in order to make the paste spread evenly, put into each of the divisions of the working-face a serpentine groove. I also make this tool in two parts, screwed or bolted together through slots, so that the break in the working-face may be adjusted. These tools, if made of wood, can readily be refaced by a plane when they are worn, and by making them in two parts, as described, a very simple tool can be used for this purpose.

In the drawings, Figure 1 is a perspective showing the working-face of the tool, and Fig. 2 is a transverse section through one of the bolts.

A is the forward section, and A' is the rear section. These two sections are bolted together by bolts $b$ through slots $c$, so that one part may be adjusted up or down with relation to the other. The forward section has its lower face beveled backward to the edge, as shown; and I prefer to round the forward part of the bevel, as shown at $d$. The rear section I prefer to make with a straight bevel. Into each of these faces I put a serpentine groove, $e$ or $g$, as shown. The terminal ears $i$ serve to attach this tool to the frame of the machine.

The angle at which this spreading-tool is set in work is proximately shown in Fig. 2, in which H shows the plane in which the cloth runs, and the direction of its run is shown by the arrow. The tool may be more or less inclined to the cloth than shown, and the forward section of the tool be adjusted a little higher or a little lower, according to the composition of the magma to be spread.

The advantages of this tool are that a thicker coat of rubber compound can be worked into fabric in one operation than usual without deterioration of quality. It is usual in the finer grades of these artificial leather goods, particularly in such as are to be finished by pebbling, graining, or embossing, to make the coat by several successive scrapings, each coat being very thin. By the use of this sort of tool the thickness of coating required of the same quality can be pressed into the fabric in fewer passages under the knife, drying in the machine; and this tool is very easy and cheap to make, renew, or repair, or reface, and these advantages arise partly from form and partly from material; but the advantages in material cannot be obtained except by a substantial observance of the form described, while the advantages of form are measurably alike for metal or glass.

Having thus fully described my invention, I claim and desire to secure by Letters Patent of the United States—

1. The spreading-tool for coating fabrics with plastic material, formed in two parts adjustable upon each other, and presenting to the work a lower face having two beveled edges, one on each section of the tool, whereby two scraping-edges are presented to the fabric at different heights, separated from each other by a recess, substantially as described.

2. A wooden spreading-tool for machines for coating fabrics with plastic material, formed with a double-working face, having two scraping-edges at different heights, separated from each other by a recess, substantially as described.

3. A spreading-tool having a working-face with two scraping-edges at different heights, and formed with the curve $d$ on its forward lower surface, substantially as described.

4. The curved groove $e$, in the lower working-face of a spreading-tool, substantially as described.

5. The curved groove $g$, in the lower working-face of a spreading-tool, substantially as described.

6. The spreading-tool formed at its lower working-face into the curve $d$, and the bevel $f$, and provided with the grooves $e$ and $g$, substantially as described.

ALBERT C. BARSTOW.

Witnesses:
WINFIELD S. PETERS,
W. FISK GILE.